(12) United States Patent
Tsai et al.

(10) Patent No.: US 11,469,993 B2
(45) Date of Patent: *Oct. 11, 2022

(54) CONTROLLING PATHS IN A NETWORK VIA A CENTRALIZED CONTROLLER OR NETWORK DEVICES

(71) Applicant: Juniper Networks, Inc., Sunnyvale, CA (US)

(72) Inventors: Jenchieh Tsai, Millburn, NJ (US); Francois Effendy, Franklin Park, NJ (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/249,322

(22) Filed: Feb. 26, 2021

(65) Prior Publication Data

US 2021/0194797 A1 Jun. 24, 2021

Related U.S. Application Data

(63) Continuation of application No. 16/369,979, filed on Mar. 29, 2019, now Pat. No. 10,958,567.

(51) Int. Cl.
*H04L 45/28* (2022.01)
*H04L 45/00* (2022.01)
*H04L 45/42* (2022.01)

(52) U.S. Cl.
CPC .............. *H04L 45/28* (2013.01); *H04L 45/22* (2013.01); *H04L 45/42* (2013.01)

(58) Field of Classification Search
CPC ......... H04L 45/22; H04L 45/28; H04L 45/42; H04L 45/50; H04L 45/64; G05B 19/0423; G05B 2219/21063
See application file for complete search history.

(56) References Cited

U.S. PATENT DOCUMENTS 6,112,249 A * 8/2000 Bader ..................... H04L 45/22
  330/3
6,311,288 B1 10/2001 Heeren et al.
(Continued)

OTHER PUBLICATIONS

Kim et al., "Coronet: Fault tolerance for Software Defined Networks", 2012, IEEE, 20th IEEE International Conference on Network Protocols (ICNP), Oct. 30-Nov. 2, 2012 (Year: 2012).*
(Continued)

*Primary Examiner* — Chi H Pham
*Assistant Examiner* — Vladislav Y Agureyev
(74) *Attorney, Agent, or Firm* — Harrity & Harrity, LLP

(57) ABSTRACT

A device provides path data associated with a network that includes network devices interconnected by links. The path data includes data identifying a first path and a second path to be provided through the network. The device provides an instruction to cause the network devices to provide information identifying the first path and to route traffic via the first path, and receives an indication of a failure associated with the first path. The indication causes the network devices to provide information identifying the second path and to re-route the traffic from the first path to the second path. The device causes the failure associated with the first path to be repaired while the traffic is re-routed to the second path, and provides, based on causing the failure to be repaired, another instruction to cause the network devices to route the traffic via the first path.

20 Claims, 14 Drawing Sheets

(56) References Cited

U.S. PATENT DOCUMENTS

| | | |
|---|---|---|
| 7,269,132 B1 | 9/2007 | Casey et al. |
| 7,391,719 B2 | 6/2008 | Ellis et al. |
| 7,818,606 B1 * | 10/2010 | Stack ................ H04L 49/557 709/224 |
| 9,344,359 B1 | 5/2016 | Tiruveedhula et al. |
| 9,455,821 B2 | 9/2016 | Shi et al. |
| 9,716,615 B1 | 7/2017 | Grosser et al. |
| 2003/0221018 A1 | 11/2003 | Lee et al. |
| 2004/0085894 A1 | 5/2004 | Wang et al. |
| 2004/0128201 A1 | 7/2004 | Ofir et al. |
| 2009/0190478 A1 | 7/2009 | Li et al. |
| 2009/0201805 A1 | 8/2009 | Begen et al. |
| 2010/0157807 A1 | 6/2010 | Csaszar et al. |
| 2011/0083051 A1 | 4/2011 | Chin et al. |
| 2012/0020207 A1 | 1/2012 | Corti et al. |
| 2012/0188869 A1 | 7/2012 | Lee et al. |
| 2013/0094350 A1 * | 4/2013 | Mandal ............. H04L 41/0668 370/400 |
| 2013/0188478 A1 | 7/2013 | Kayser |
| 2013/0215769 A1 | 8/2013 | Beheshti-Zavareh et al. |
| 2013/0329546 A1 | 12/2013 | Wijnands |
| 2014/0016455 A1 | 1/2014 | Ruetschi et al. |
| 2014/0056126 A1 | 2/2014 | Bencheck et al. |
| 2014/0086043 A1 * | 3/2014 | Banerjee ............... H04L 43/16 370/221 |
| 2014/0328163 A1 | 11/2014 | Del Regno et al. |
| 2014/0341012 A1 | 11/2014 | Holness et al. |
| 2015/0023663 A1 | 1/2015 | Gerstel |
| 2015/0207677 A1 * | 7/2015 | Choudhury ........... H04L 47/12 370/254 |
| 2015/0295817 A1 | 10/2015 | Xu et al. |
| 2015/0312091 A1 * | 10/2015 | Yang ................ H04L 41/0663 370/221 |
| 2015/0326427 A1 | 11/2015 | Ali |
| 2015/0350043 A1 | 12/2015 | Kovacs et al. |
| 2016/0248664 A1 | 8/2016 | Huang |
| 2016/0337168 A1 | 11/2016 | Rebella et al. |
| 2017/0093611 A1 | 3/2017 | Arora et al. |
| 2017/0126482 A1 * | 5/2017 | Jayaraman ........... H04L 45/22 |
| 2017/0126545 A1 | 5/2017 | Yi |
| 2017/0155542 A1 * | 6/2017 | Fang ................. H04L 41/0663 |
| 2017/0257228 A1 * | 9/2017 | Chen ................... H04L 45/04 |
| 2017/0289027 A1 * | 10/2017 | Ratnasingham ....... H04L 45/42 |
| 2017/0318113 A1 * | 11/2017 | Ganichev .............. H04L 67/34 |
| 2018/0123960 A1 | 5/2018 | Hu et al. |
| 2018/0302152 A1 | 10/2018 | Shikhmanter et al. |
| 2019/0052519 A1 | 2/2019 | Rebella et al. |
| 2019/0109638 A1 | 4/2019 | Yilmaz et al. |
| 2019/0239276 A1 | 8/2019 | Virtanen et al. |
| 2020/0037225 A1 * | 1/2020 | Hung ................... H04L 45/54 |

OTHER PUBLICATIONS

Co-pending U.S. Appl. No. 16/369,979, inventors Jenchieh Tsai et al., filed Mar. 29, 2019.

Extended European Search Report for Application No. EP19218949.6, dated May 13, 2020, 8 pages.

* cited by examiner

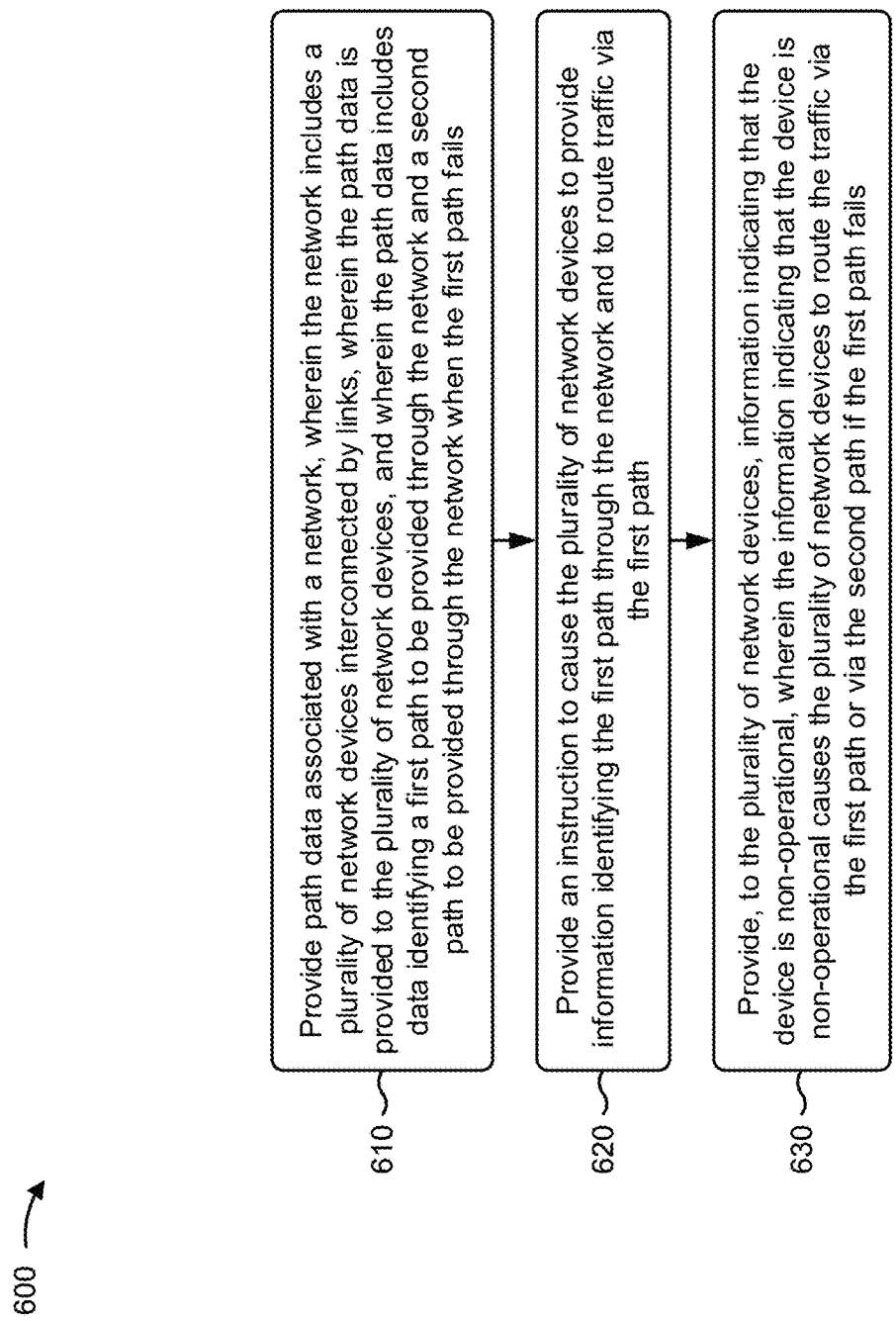

CONTROLLING PATHS IN A NETWORK VIA A CENTRALIZED CONTROLLER OR NETWORK DEVICES

RELATED APPLICATION

This application is a continuation of U.S. patent application Ser. No. 16/369,979, filed Mar. 29, 2019, which is incorporated herein by reference in its entirety.

BACKGROUND

Paths may be provided through a network via network devices (e.g., routers, switches, gateways, firewalls, etc.) and links provided between the network devices. The paths provided through the network may be established by and controlled with a centralized controller.

SUMMARY

According to some implementations, a method may include providing path data associated with a network, wherein the network includes a plurality of network devices interconnected by links, wherein the path data is provided to the plurality of network devices, wherein the plurality of network devices store the path data, and wherein the path data includes data identifying a first path to be provided through the network, and a second path to be provided through the network. The method may include providing an instruction to cause the plurality of network devices to provide information identifying the first path through the network and to route traffic via the first path, and receiving an indication of a failure associated with the first path, wherein the indication causes the plurality of network devices to provide information identifying the second path through the network and to re-route the traffic from the first path to the second path. The method may include causing the failure associated with the first path to be repaired while the traffic is re-routed to the second path, and providing, based on causing the failure associated with the first path to be repaired, another instruction to cause the plurality of network devices to route the traffic via the first path again.

According to some implementations, a device may include one or more memories, and one or more processors, communicatively coupled to the one or more memories, to provide path data associated with a network, wherein the network includes a plurality of network devices interconnected by links, wherein the path data is provided to the plurality of network devices, and wherein the path data includes data identifying a primary path to be provided through the network, and a secondary path to be provided through the network when the primary path fails. The one or more processors may provide an instruction to cause the plurality of network devices to provide information identifying the primary path through the network and to route traffic via the primary path, and may receive an indication of a failure associated with the primary path, wherein the indication causes the plurality of network devices to provide information identifying the secondary path through the network and to re-route the traffic from the primary path to the secondary path. The one or more processors may cause the failure associated with the primary path to be repaired while the traffic is re-routed to the secondary path, and may provide, based on causing the failure associated with the primary path to be repaired, another instruction to cause the plurality of network devices to route the traffic via the primary path again.

According to some implementations, a non-transitory computer-readable medium may store instructions that include one or more instructions that, when executed by one or more processors of a device, may cause the one or more processors to provide path data associated with a network, wherein the network includes a plurality of network devices interconnected by links, wherein the path data is provided to the plurality of network devices, and wherein the path data includes data identifying a first path to be provided through the network, and a second path to be provided through the network when the first path fails. The one or more instructions may cause the one or more processors to provide an instruction to cause the plurality of network devices to provide information identifying the first path through the network and to route traffic via the first path. The one or more instructions may cause the one or more processors to provide, to the plurality of network devices, information indicating that the device is non-operational, wherein the information indicating that the device is non-operational causes the plurality of network devices to route the traffic via the first path or via the second path if the first path fails.

BRIEF DESCRIPTION OF THE DRAWINGS

FIGS. 4-6 are flow charts of example processes for controlling paths in a network via a centralized controller or network devices.

DETAILED DESCRIPTION

The following detailed description of example implementations refers to the accompanying drawings. The same reference numbers in different drawings may identify the same or similar elements.

A centralized controller may establish, control, and/or repair hundreds, thousands, and/or the like of paths provided in a network. If multiple repairs of non-operational paths are required, the centralized controller may not receive information associated with the non-operational paths in a timely manner (e.g., due to volume), may not repair the non-operational paths in a timely manner (e.g., due to volume), and/or the like. Furthermore, if the centralized controller becomes non-operational, no paths through the network will be established, controlled, and/or repaired. Thus, the centralized controller may cause traffic to be lost via non-operational paths and may cause computing resources (e.g., processing resources, memory resources, and/or the like), networking resources, and/or the like to be wasted in identifying the lost traffic, correcting non-operational paths, re-routing the lost traffic, and/or the like.

Some implementations described herein provide a controller platform that shares control of paths in a network with network devices. For example, the controller platform may provide path data associated with a network that includes network devices interconnected by links. The path data may be provided to the plurality of network devices and may include data identifying a primary path to be provided through the network, and a secondary path to be provided through the network when the primary path fails. The controller platform may provide an instruction to cause the network devices to provide information identifying the primary path through the network and to route traffic via the primary path, and may receive an indication of a failure associated with the primary path. The indication may cause the network devices to provide information identifying the secondary path through the network and to re-route the traffic from the primary path to the secondary path. The controller platform may cause the failure associated with the primary path to be repaired while the traffic is re-routed to the secondary path, and may provide, based on causing the failure associated with the primary path to be repaired, another instruction to cause the network devices to route the traffic via the primary path again.

In this way, the centralized controller may share control of paths with network devices and prevent traffic from being lost via non-operational paths. This, in turn, conserves computing resources (e.g., processing resources, memory resources, and/or the like), networking resources, and/or the like that would otherwise be wasted in identifying lost traffic, correcting non-operational paths, re-routing lost traffic, and/or the like.

Figure 1A:
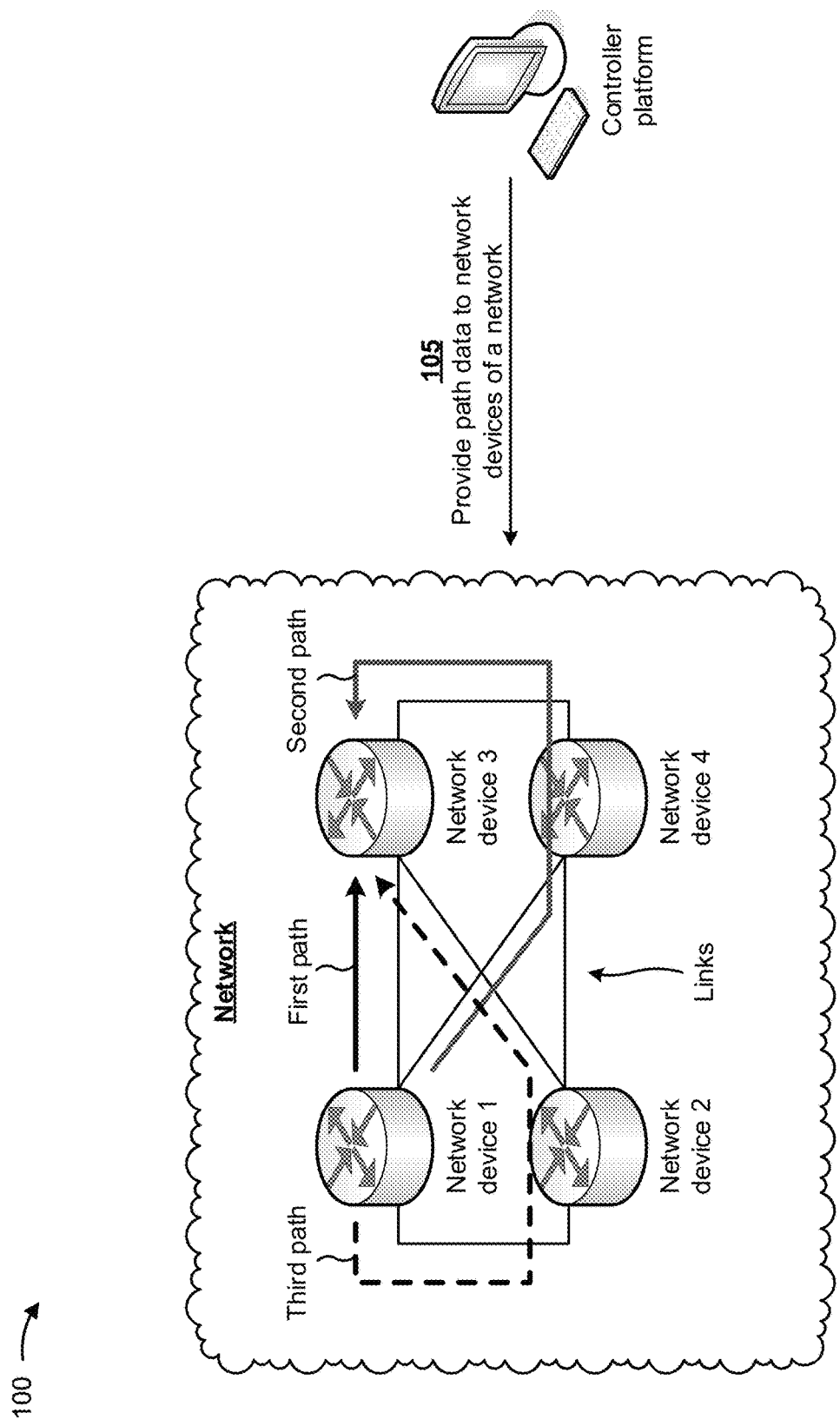
FIGS. 1A-1I are diagrams of one or more example implementations described herein.

FIGS. 1A-1I are diagrams of one or more example implementations 100 described herein. As shown in FIG. 1A, a network may be associated with a controller platform. In some implementations, the network may include a packet optical network with multiple network devices and multiple links provided between the multiple network devices. For example, the network may include a first network device (e.g., network device 1), a second network device (e.g., network device 2), a third network device (e.g., network device 3), a fourth network device (e.g., network device 4), and/or the like. In some implementations, the controller platform may operate in a hybrid mode where the controller platform manages and controls primary paths provided between network devices, and the network devices control and manage secondary paths provided between the network devices when the primary paths are non-operational.

As further shown in FIG. 1A, and by reference number 105, the controller platform may provide path data to the network devices of the network. In some implementations, the network devices may receive and store the path data. In some implementations, the path data may include data identifying a first path (or primary path) to be provided from the first network device to the third network device; a second path (or secondary path) to be provided from the first network device through the fourth network device and to the third network device; a third path to be provided from the first network device through the second network device and to the third network device; and/or the like. In some implementations, the first path, the second path, and the third path may include label-switched paths (LSPs). In some implementations, the controller platform may control the first path, for example, and the network devices may control the second path and the third path.

In some implementations, the first path may be a shortest path between the first network device and the third network device, the second path may be a next shortest path between the first network device and the third network device, and the third path may be a third shortest path between the first network device and the third network device. In some implementations, if the second path and the third path are approximately equal in length, the first network device may select the second path or the third path based on a round-robin technique, a random selection technique, traffic congestion associated with the second path and the third path, and/or the like.

Figure 1B:
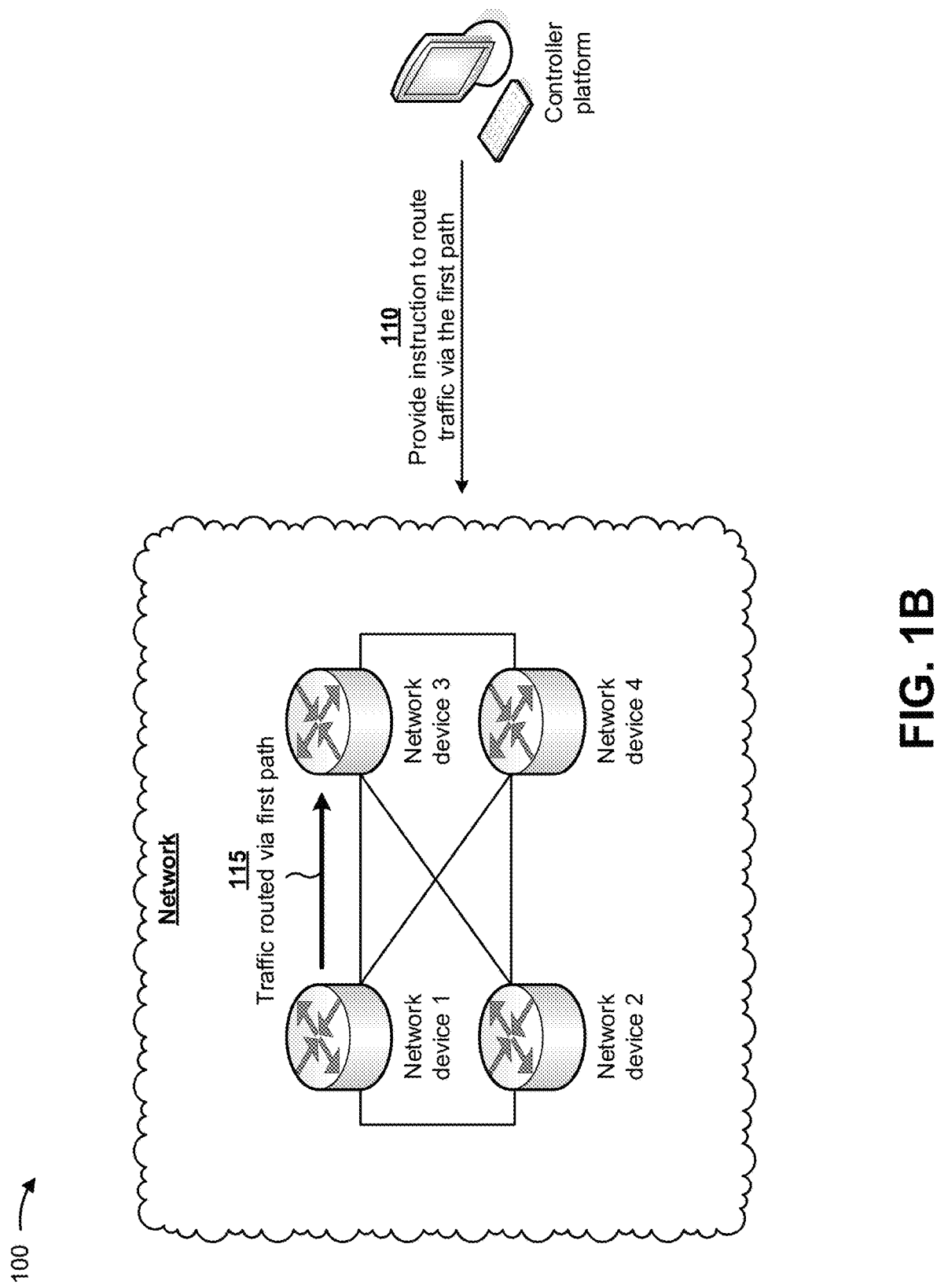

As shown in FIG. 1B, and by reference number 110, the controller platform may provide (e.g., to the first network device) an instruction to route traffic via the first path. In some implementations, the first network device may receive the instruction and may cause traffic to be routed via the first path based on the instruction, as shown by reference number 115. In some implementations, the controller platform may provide the instruction to one or more of the network devices, and the one or more network devices may route traffic via the first path based on the instruction. The instruction may cause the one or more network devices to provide information identifying the first path through the network and to route traffic via the first path.

Figure 1C:
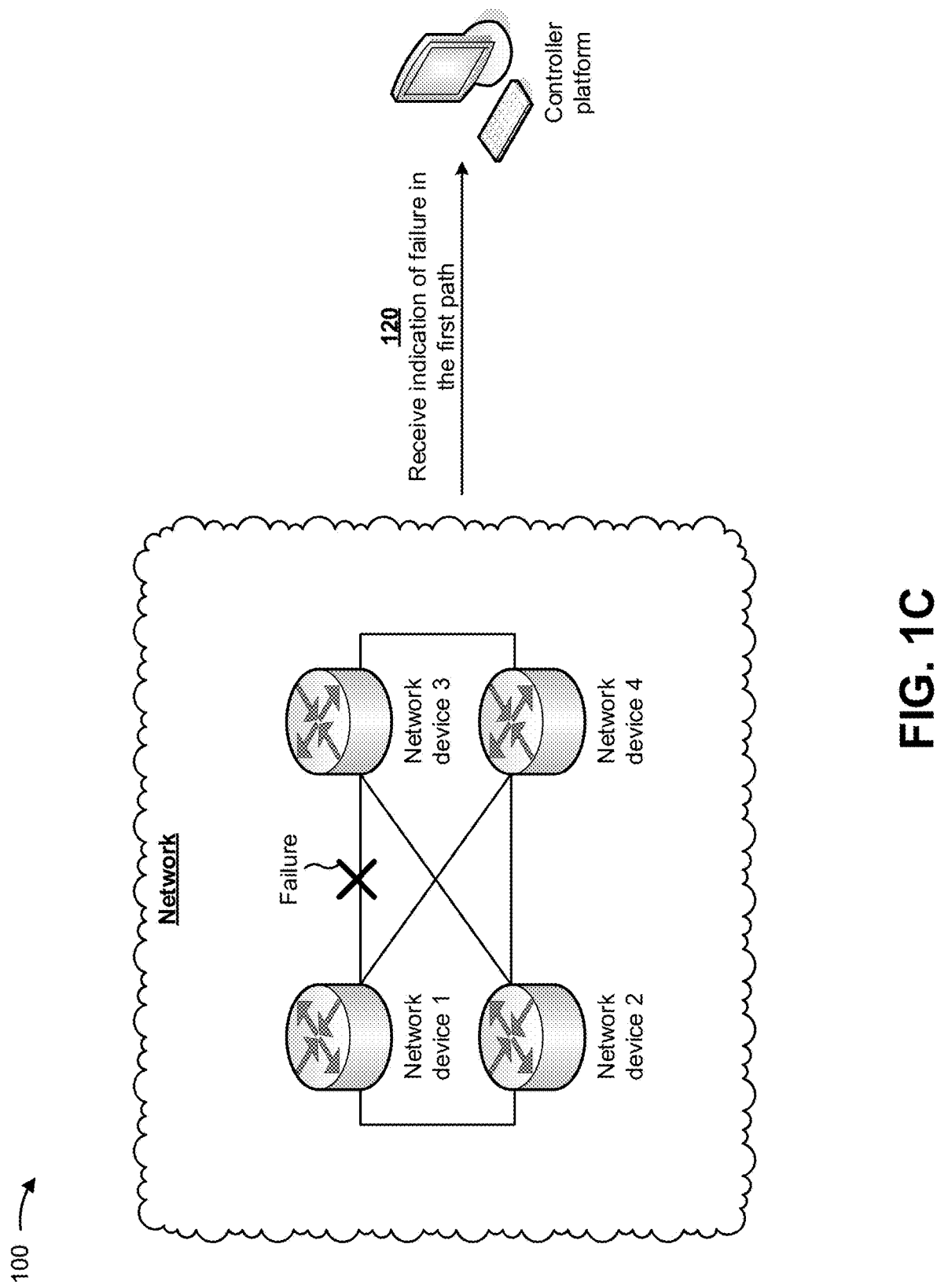

As shown in FIG. 1C, a failure may occur in the first path (e.g., at the link provided between the first network device and the third network device). In some implementations, the failure may be caused by traffic congestion associated with the link, breakage of the link, and/or the like. As further shown in FIG. 1C, and by reference number 120, the controller platform may receive an indication of the failure in the first path. In some implementations, the indication may include information indicating that the first path is non-operational or unavailable due to the failure. In some implementations, the network devices of the network may receive the indication of the failure of the first path when the controller platform receives the indication or when the controller platform does not receive the indication. In some implementations, the controller platform may receive the indication of the failure in the first path after the controller platform has previously been non-operational, as described below, and has become operational again.

Figure 1D:
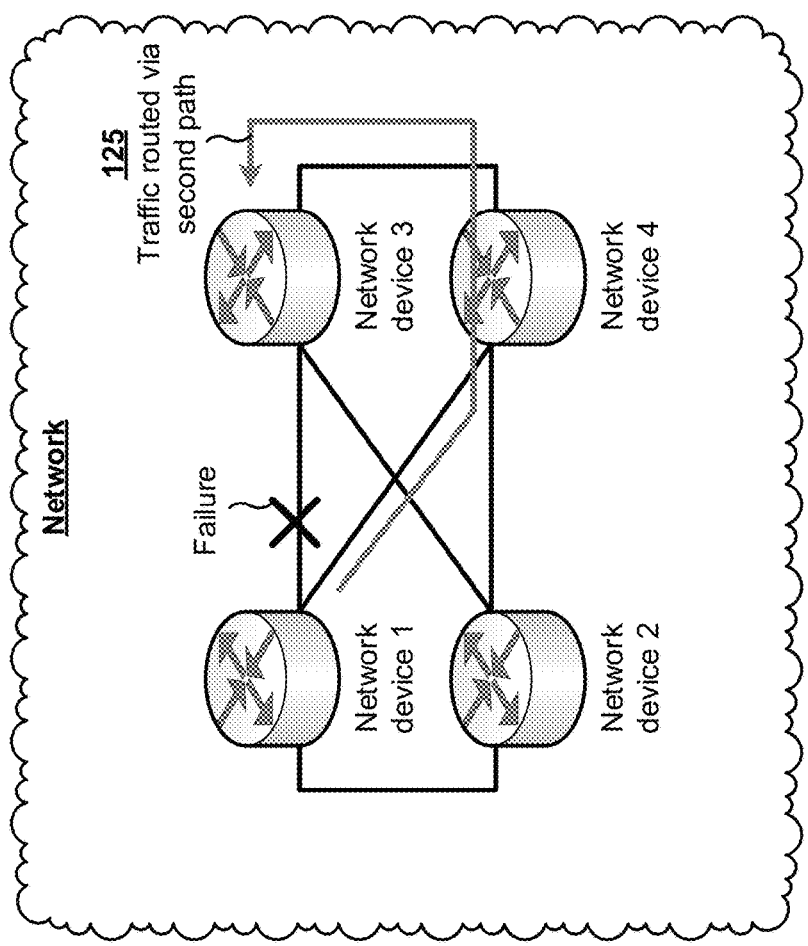

As shown in FIG. 1D, the indication of the failure in the first path may cause the network devices to provide information identifying the second path through the network (e.g., from the first network device, to the fourth network device, and to the third network device). As further shown in FIG. 1D, and by reference number 125, the indication of the failure in the first path may cause the network devices to re-route the traffic from the first path to the second path. Thus, the traffic to be provided between the first network device and the third network device is routed via the second path.

Figure 1E:
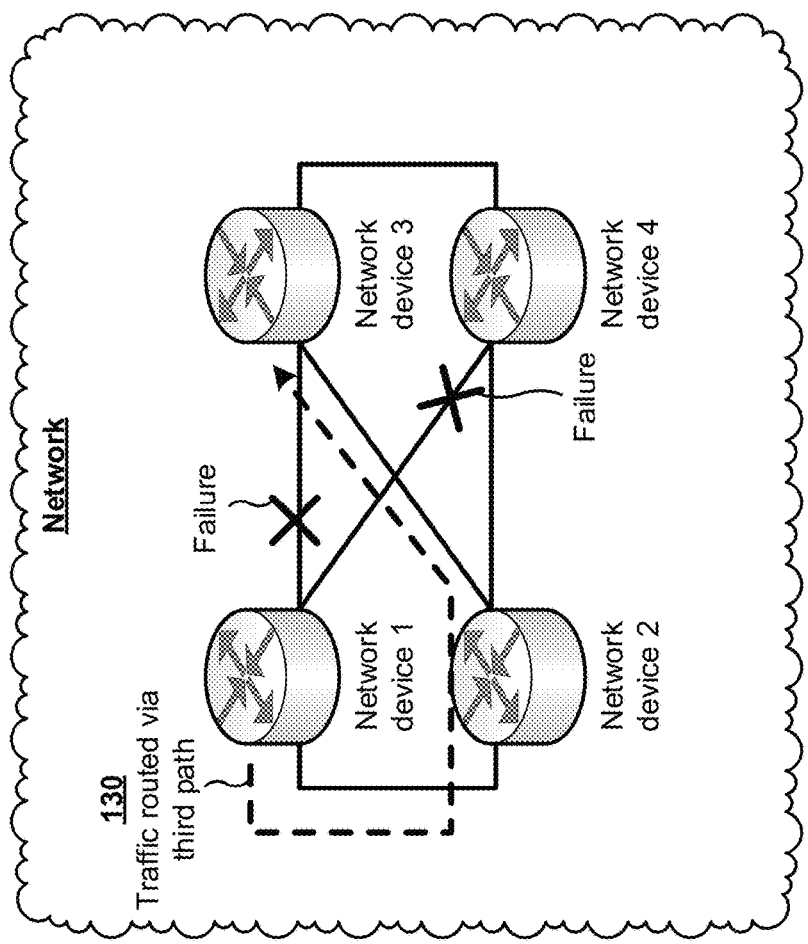

As shown in FIG. 1E, a failure may occur in the second path (e.g., at the link provided between the first network device and the fourth network device) while the traffic is being routed via the second path. For example, a failure may occur in the second path while the first path is being repaired, as described below. In some implementations, the failure may be caused by traffic congestion associated with the link, breakage of the link, and/or the like. In some implementations, the network devices of the network may receive the indication of the failure of the second path.

As further shown in FIG. 1E, the indication of the failure in the second path may cause the network devices to provide information identifying the third path through the network (e.g., from the first network device, to the second network device, and to the third network device). As further shown in FIG. 1E, and by reference number 130, the indication of the failure in the second path may cause the network devices to re-route the traffic from the second path to the third path. Thus, the traffic to be provided between the first network device and the third network device is routed via the third path.

In some implementations, when the first path fails, the controller platform may cause the first path to be repaired while the traffic is re-routed via the second path or the third path. In this way, the controller platform may repair the first path while the traffic continues to flow through the network. In some implementations, the controller platform may cause a robot to be dispatched to repair the first path (e.g., the non-operational link associated with the first path). For example, the controller platform may provide, to the robot, instructions to repair the non-operational link, and the robot may repair the non-operational link based on the instructions. In this way, the controller platform may conserve computing resources (e.g., processing resources, memory resources, and/or the like), networking resources, and/or the like that would otherwise be wasted in identifying traffic lost on failed paths, re-routing the lost traffic, and/or the like.

In some implementations, when the first path fails because of traffic congestion, the controller platform may instruct the network devices to re-route a portion of the traffic from the first path to the second path, to re-route all of the traffic from the first path to the second path, and/or the like. In this way, the controller platform may mitigate the traffic congestion associated with the first path.

In some implementations, the controller platform may provide (e.g., to a client device) information indicating that the first path needs repair. For example, the controller platform may provide, to the client device, a user interface that includes information indicating that the first path needs repair. The client device may receive the user interface and may provide the user interface for display to a user of the client device and the user may dispatch a technician to repair the first path. In some implementations, the one or more of the network devices may determine that the second path (or the third path) needs repair and may repair the second path (or the third path).

In some implementations, the controller platform may cause the network devices associated with the first path to not utilize the non-operational link. For example, the controller platform may cause the first network device and the third network device to not utilize the non-operational link provided between the first network device and the third network device. In some implementations, the controller platform may provide, to the first network device and the third network device, instructions to not utilize the non-operational link, and the first network device and the third network device may not utilize the non-operational link based on the instructions.

Figure 1F:
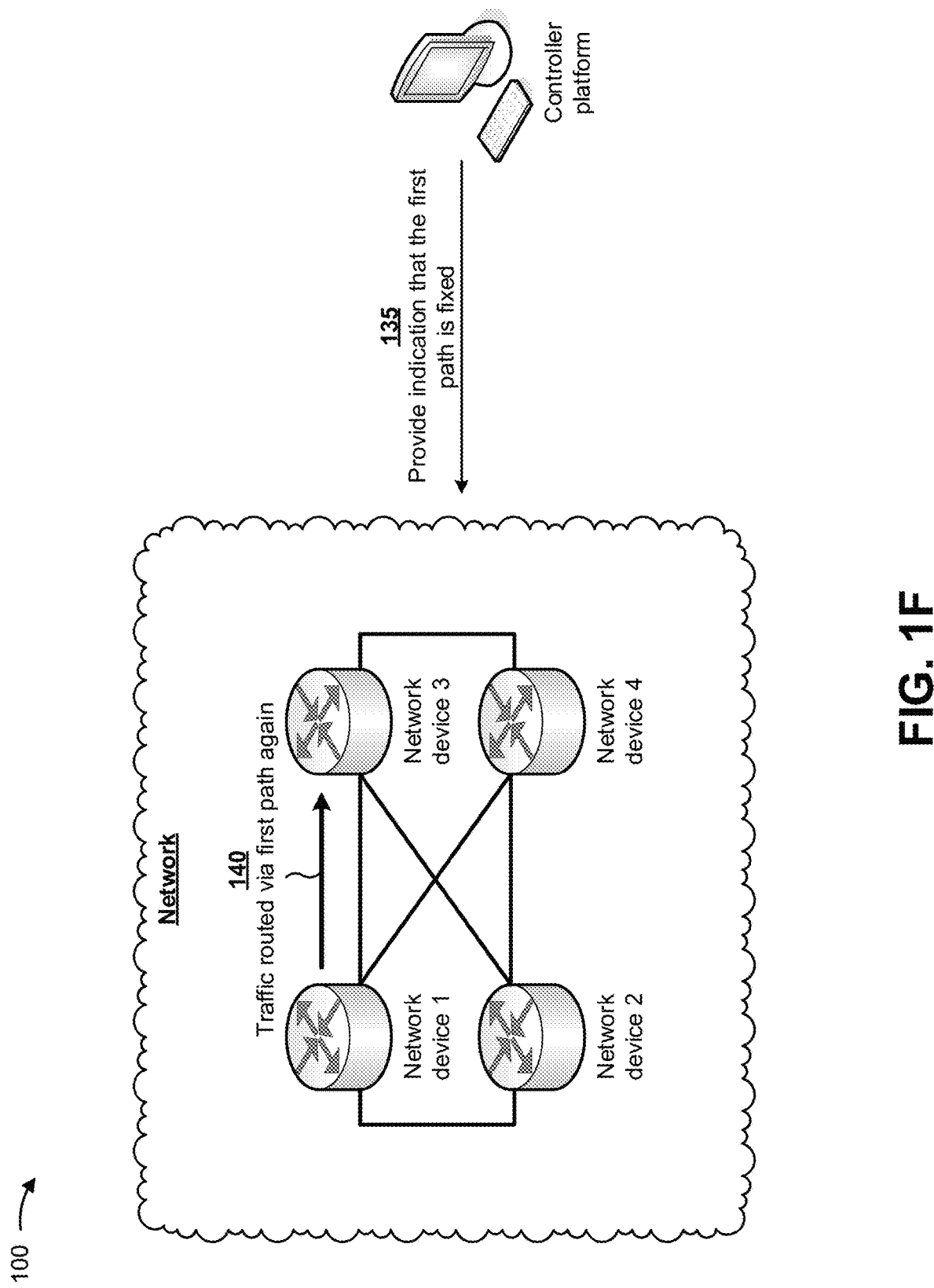

As shown in FIG. 1F, and by reference number 135, when the first path is fixed or repaired, the controller platform may provide, to the network devices, an indication that the first path is fixed. In some implementations, the indication may include an instruction to re-route traffic via the first path. In some implementations, the first network device may receive the instruction and may cause traffic to be re-routed from the second path (or the third path) to the first path based on the instruction, as indicated by reference number 140 in FIG. 1F. In some implementations, the controller platform may provide the instruction to one or more of the network devices, and the one or more network devices may re-route traffic from the second path (or the third path) to the first path based on the instruction. The instruction may cause the one or more network devices to provide information identifying the first path through the network and to re-route traffic to the first path.

In some implementations, when the first path fails and traffic has been re-routed to the second path or the third path, the network devices may continue to route the traffic via the second path or the third path until the second path or the third path fails. Once the second path or the third path fails, the network devices may re-route the traffic to the first path in accordance with the instruction received from the controller platform.

Figure 1G:
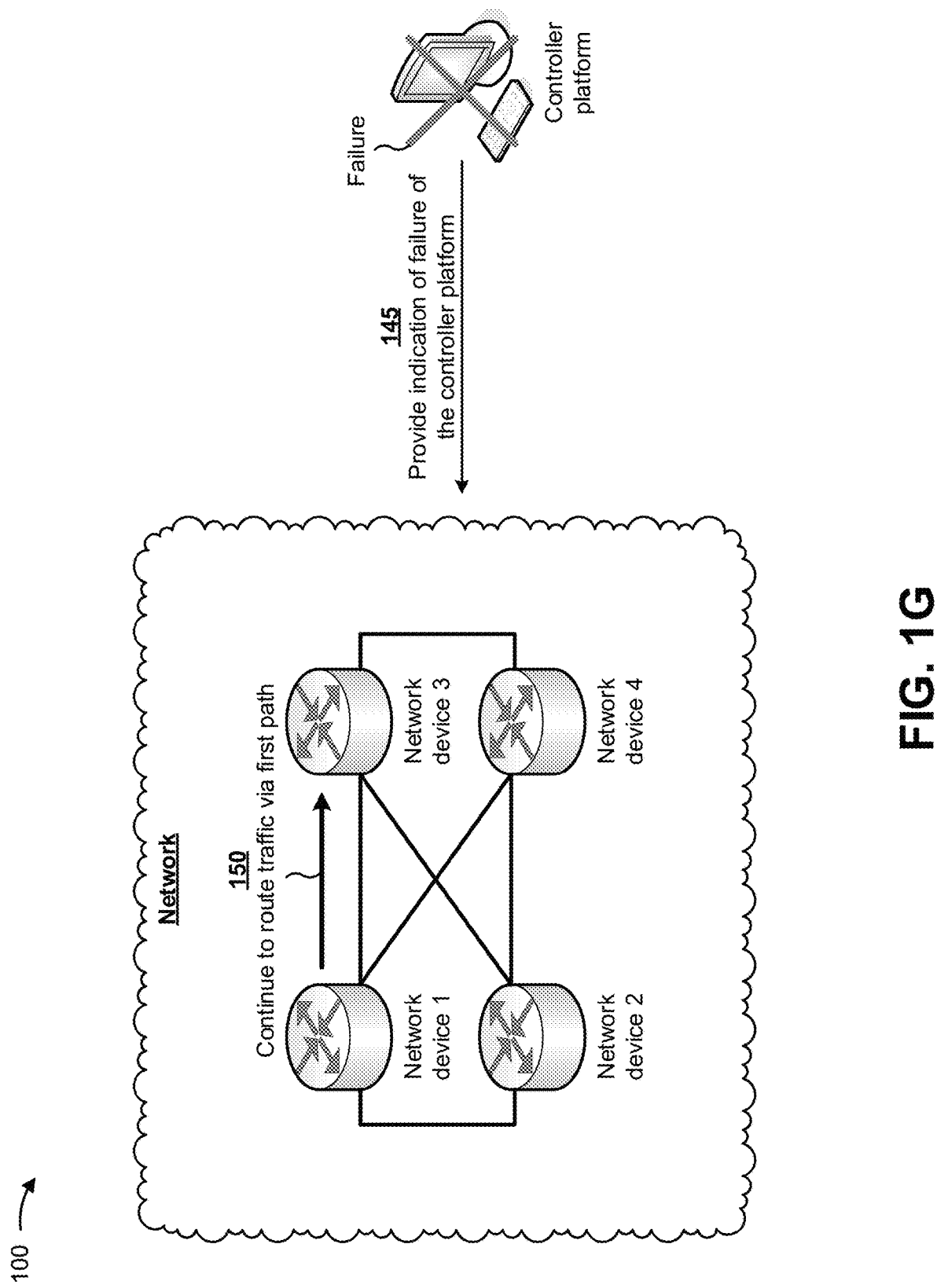

As shown in FIG. 1G, the controller platform may experience a failure (e.g., a power failure) when the traffic is being routed via the first path. As further shown in FIG. 1G, and by reference number 145, the controller platform may provide, to the network devices, an indication of the failure of the controller platform. In some implementations, the indication of the failure may include the network devices failing to receive a signal from the controller platform, failing to communicate with the controller platform, and/or the like.

As further shown in FIG. 1G, and by reference number 150, the network devices may continue to route the traffic via the first path even after receiving the indication of the failure of the controller platform. In some implementations, the network devices may manage and control the first path until the controller platform becomes operational again. In some implementations, the network devices may re-route the traffic from the first path to the second path in the event of a failure of the first path and/or due to the failure of the controller platform, as described above in connection with FIGS. 1C and 1D. In such implementations, the network devices may not manage and control the first path, and thus may re-route the traffic to the second path, which is managed and controlled by the network devices.

Figure 1H:
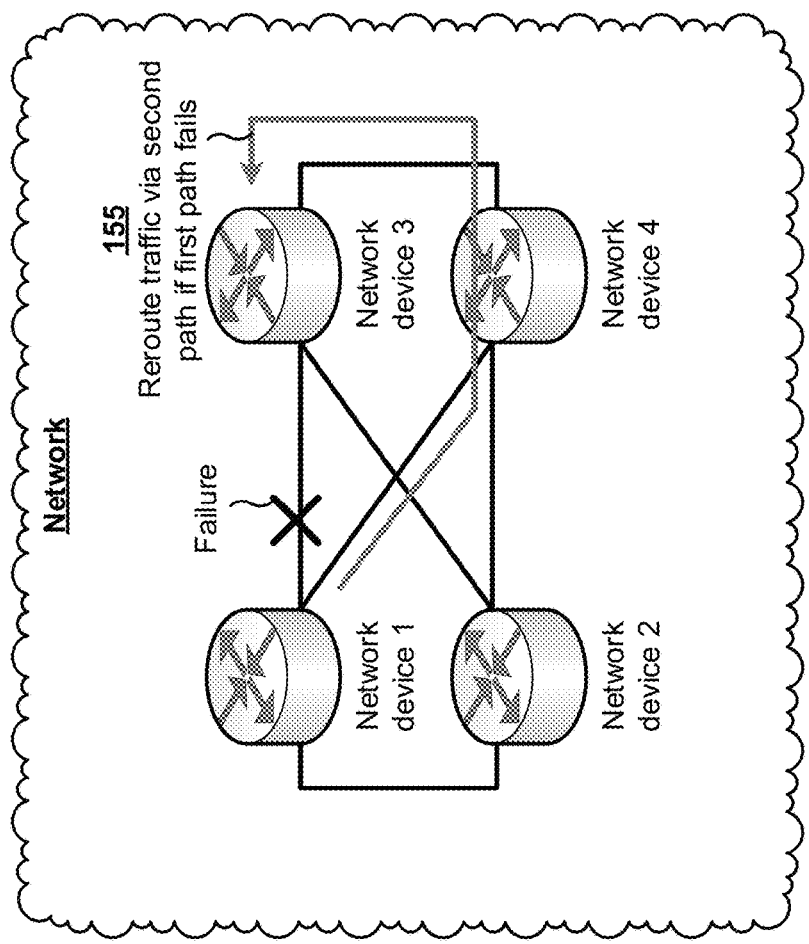

As shown in FIG. 1H, a failure may occur in the first path while the controller platform is non-operational. The network devices may detect the failure of the first path even when the controller platform is non-operational. The failure in the first path may cause the network devices to provide information identifying the second path through the network (e.g., from the first network device, to the fourth network device, and to the third network device). As further shown in FIG. 1H, and by reference number 155, the failure in the first path may cause the network devices to re-route the traffic from the first path to the second path. Thus, the traffic to be provided between the first network device and the third network device is routed via the second path.

Figure 1I:
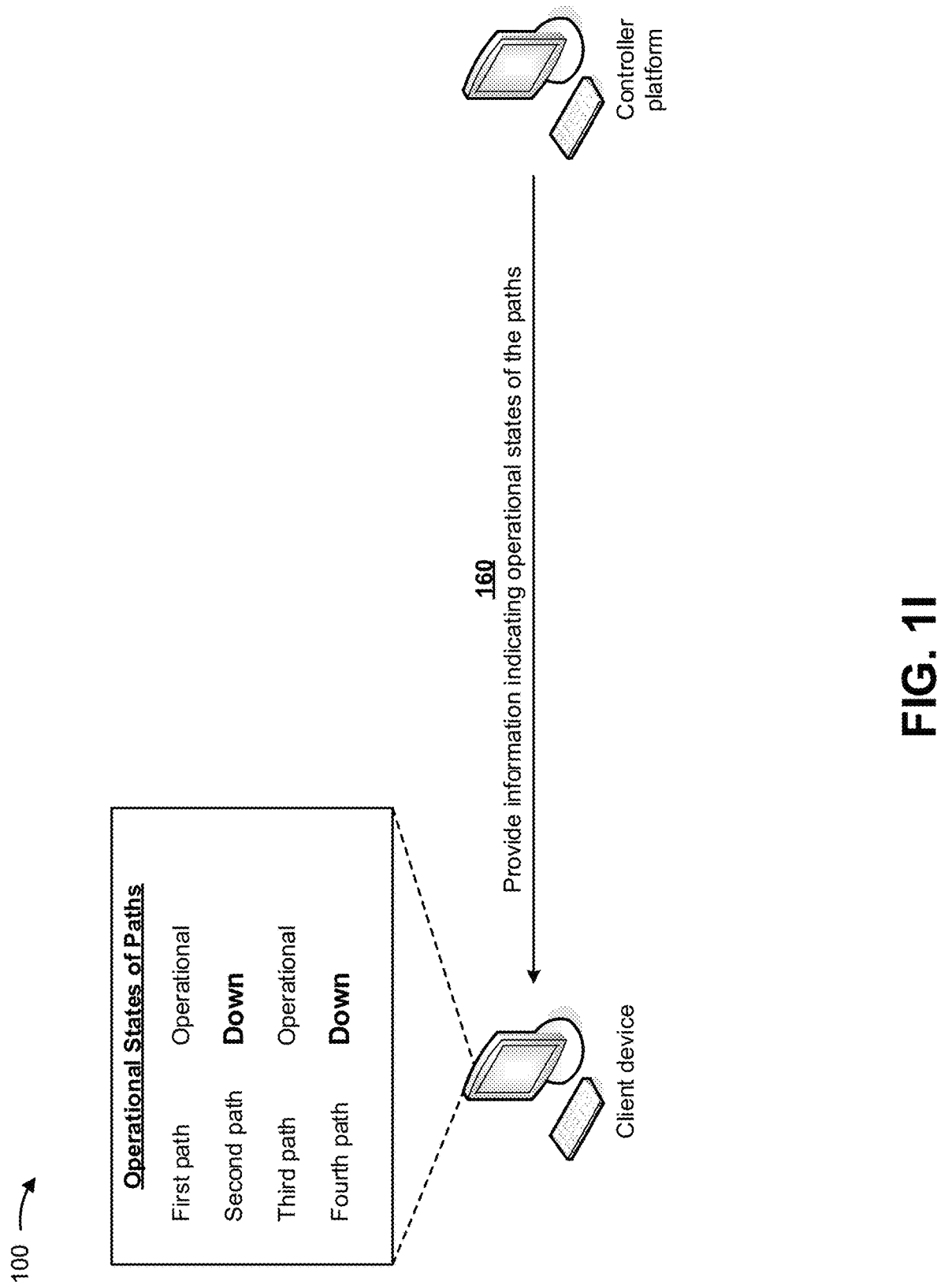

As shown in FIG. 1I, and by reference number 160, the controller platform may provide, to a client device, information indicating the operational states of the paths. In some implementations, the controller platform may generate a user interface that includes information indicating the operational states of the paths and may provide the user interface to the client device. The client device may receive the user interface and may display the user interface to a user of the client device. For example, as shown in FIG. 1I, the user interface may include information indicating that a first path is operational, a second path is non-operational or "down," a third path is operational, a fourth path is non-operational or "down," and/or the like.

In this way, the centralized controller platform may share control of paths with network devices and may prevent traffic from being lost via non-operational paths. This, in turn, conserves computing resources (e.g., processing resources, memory resources, and/or the like), networking resources, and/or the like that would otherwise be wasted in identifying lost traffic, correcting non-operational paths, re-routing lost traffic, and/or the like. Furthermore, implementations described herein use a rigorous, computerized process to perform tasks that were not previously performed. For example, currently there does not exist a technique that shares control of paths provided through a network among a centralized controller and network devices.

As indicated above, FIGS. 1A-1I are provided merely as examples. Other examples may differ from what is described with regard to FIGS. 1A-1I.

Figure 2:
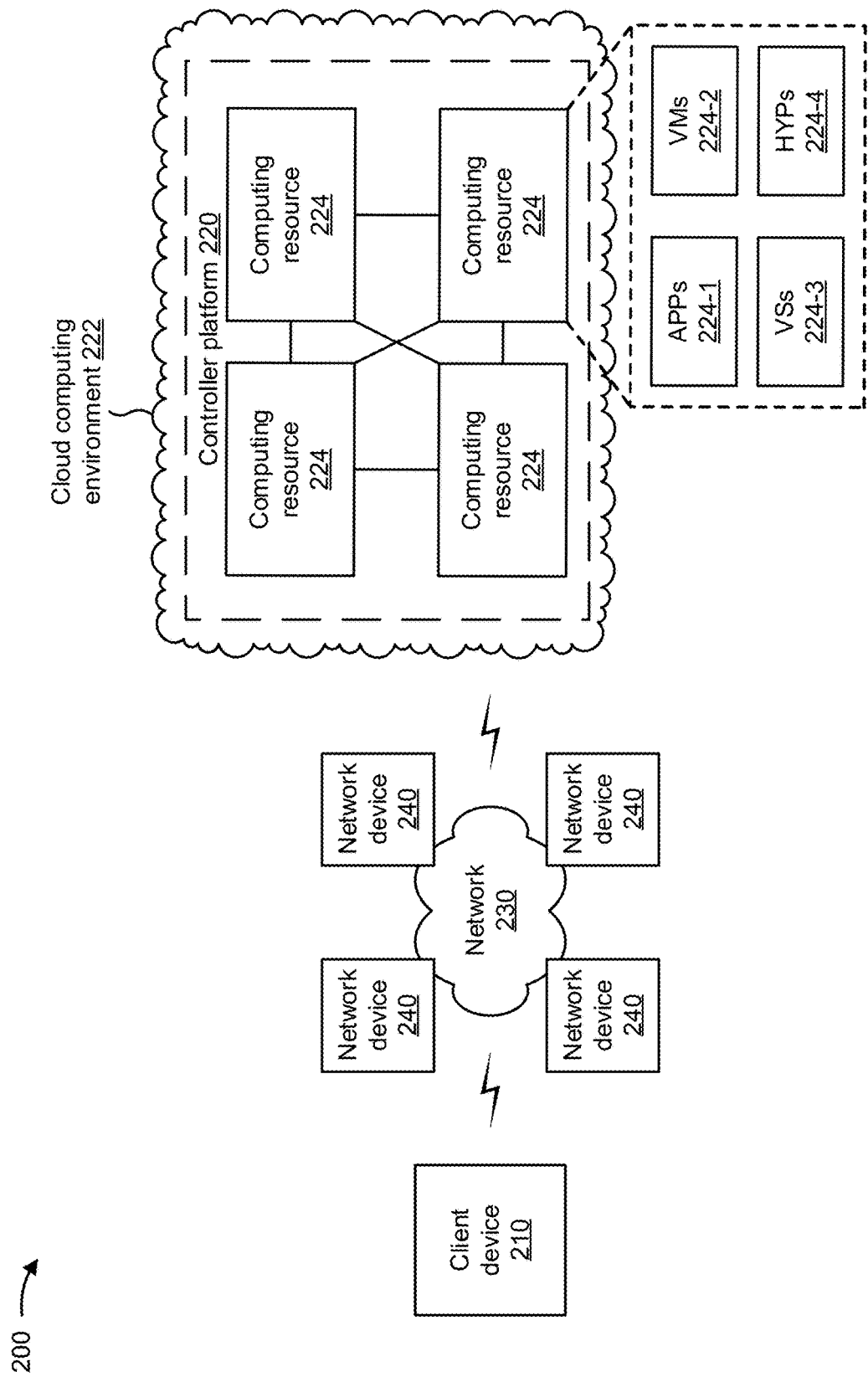
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a client device 210, a controller platform 220, a network 230, and a group of network devices 240 of network 230. Devices of environment 200 may interconnect via wired connections, wireless connections, or a combination of wired and wireless connections.

Client device 210 includes one or more devices capable of receiving, generating, storing, processing, and/or providing information, such as information described herein. For example, client device 210 may include a mobile phone (e.g., a smart phone, a radiotelephone, etc.), a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, a head mounted display, etc.), or a similar type of device. In some implementations, client device 210 may receive information from and/or transmit information to controller platform 220, via network 230 and network devices 240. In some implementations, client device 210 may receive network traffic from and/or may provide network traffic to other client devices 210 via network 230 (e.g., by routing packets using network devices 240 as intermediaries).

Controller platform 220 includes one or more devices that share control of paths in a network with network devices. In some implementations, controller platform 220 may be designed to be modular such that certain software components may be swapped in or out depending on a particular need. As such, controller platform 220 may be easily and/or quickly reconfigured for different uses. In some implementations, controller platform 220 may receive information from and/or transmit information to one or more client devices 210 and/or network devices 240.

In some implementations, as shown, controller platform 220 may be hosted in a cloud computing environment 222. Notably, while implementations described herein describe controller platform 220 as being hosted in cloud computing environment 222, in some implementations, controller platform 220 may not be cloud-based (i.e., may be implemented outside of a cloud computing environment) or may be partially cloud-based.

Cloud computing environment 222 includes an environment that hosts controller platform 220. Cloud computing environment 222 may provide computation, software, data access, storage, etc., services that do not require end-user knowledge of a physical location and configuration of system(s) and/or device(s) that hosts controller platform 220. As shown, cloud computing environment 222 may include a group of computing resources 224 (referred to collectively as "computing resources 224" and individually as "computing resource 224").

Computing resource 224 includes one or more personal computers, workstation computers, mainframe devices, or other types of computation and/or communication devices. In some implementations, computing resource 224 may host controller platform 220. The cloud resources may include compute instances executing in computing resource 224, storage devices provided in computing resource 224, data transfer devices provided by computing resource 224, etc. In some implementations, computing resource 224 may communicate with other computing resources 224 via wired connections, wireless connections, or a combination of wired and wireless connections.

As further shown in FIG. 2, computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, and/or the like.

Application 224-1 includes one or more software applications that may be provided to or accessed by client device 210. Application 224-1 may eliminate a need to install and execute the software applications on client device 210 and/or network devices 240. For example, application 224-1 may include software associated with controller platform 220 and/or any other software capable of being provided via cloud computing environment 222. In some implementations, one application 224-1 may send/receive information to/from one or more other applications 224-1, via virtual machine 224-2.

Virtual machine 224-2 includes a software implementation of a machine (e.g., a computer) that executes programs like a physical machine. Virtual machine 224-2 may be either a system virtual machine or a process virtual machine, depending upon use and degree of correspondence to any real machine by virtual machine 224-2. A system virtual machine may provide a complete system platform that supports execution of a complete operating system ("OS"). A process virtual machine may execute a single program and may support a single process. In some implementations, virtual machine 224-2 may execute on behalf of a user (e.g., a user of client device 210 or an operator of controller platform 220), and may manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 224-4 may provide hardware virtualization techniques that allow multiple operating systems (e.g., "guest operating systems") to execute concurrently on a host computer, such as computing resource 224. Hypervisor 224-4 may present a virtual operating platform to the guest operating systems and may manage the execution of the guest operating systems. Multiple instances of a variety of operating systems may share virtualized hardware resources.

Network 230 includes one or more wired and/or wireless networks. For example, network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

Network device 240 includes one or more devices capable of receiving, processing, storing, routing, and/or providing traffic (e.g., a packet, other information or metadata, and/or the like) in a manner described herein. For example, network device 240 may include a router, such as a label switching router (LSR), a label edge router (LER), an ingress router, an egress router, a provider router (e.g., a provider edge router, a provider core router, and/or the like), a virtual router, and/or the like. Additionally, or alternatively, network device 240 may include a gateway, a switch, a firewall, a hub, a bridge, a reverse proxy, a server (e.g., a proxy server, a cloud server, a data center server, and/or the like), a load balancer, and/or a similar device. In some implementations, network device 240 may be a physical device implemented within a housing, such as a chassis. In some implementations, network device 240 may be a virtual device implemented by one or more computer devices of a cloud computing environment or a data center. In some implementations, a group of network devices 240 may be a group of data center nodes that are used to route traffic flow through network 230.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
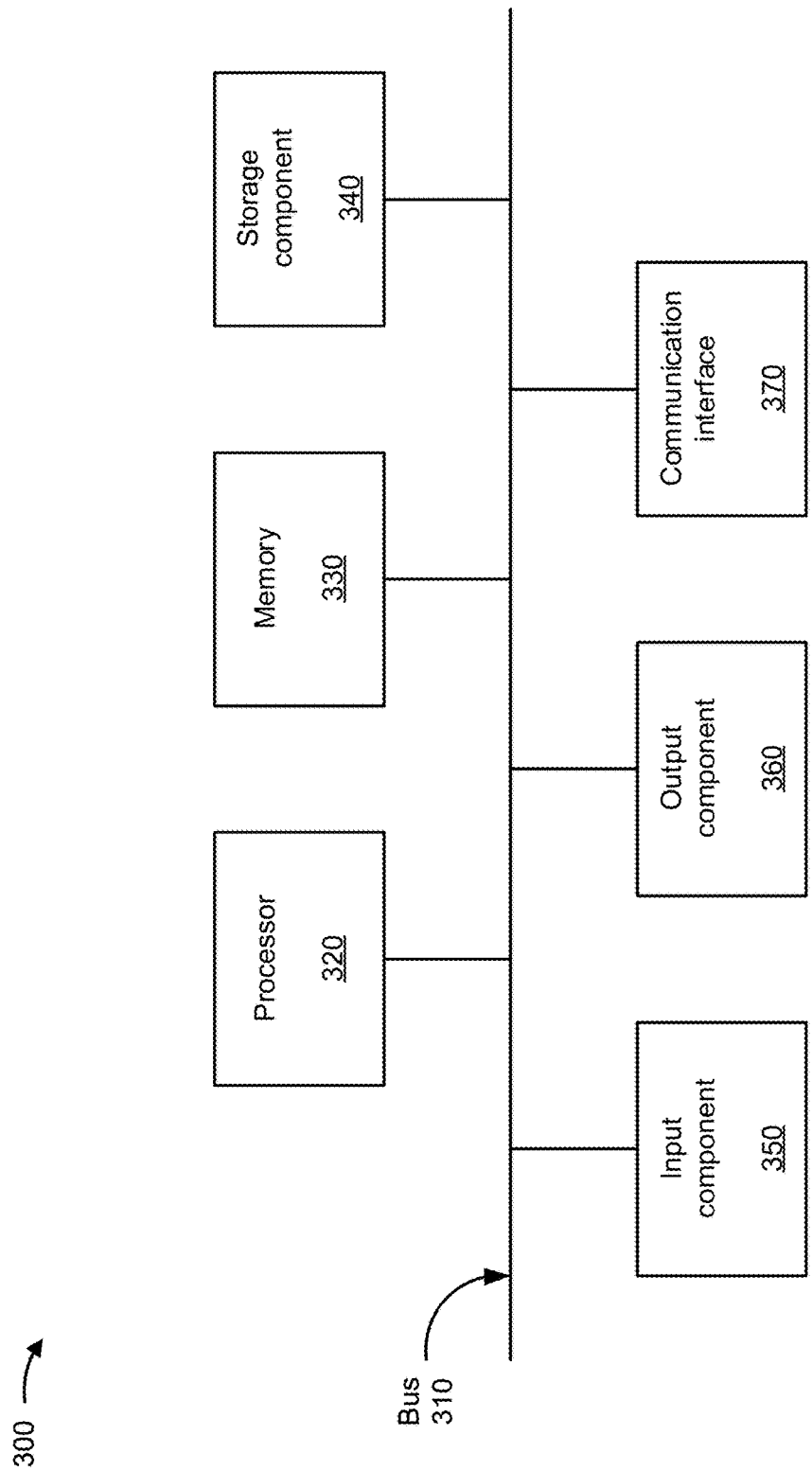
FIG. 3 is a diagram of example components of one or more devices of FIG. 2.

FIG. 3 is a diagram of example components of a device 300. Device 300 may correspond to client device 210, controller platform 220, computing resource 224, and/or network device 240. In some implementations, client device 210, controller platform 220, computing resource 224, and/or network device 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random-access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
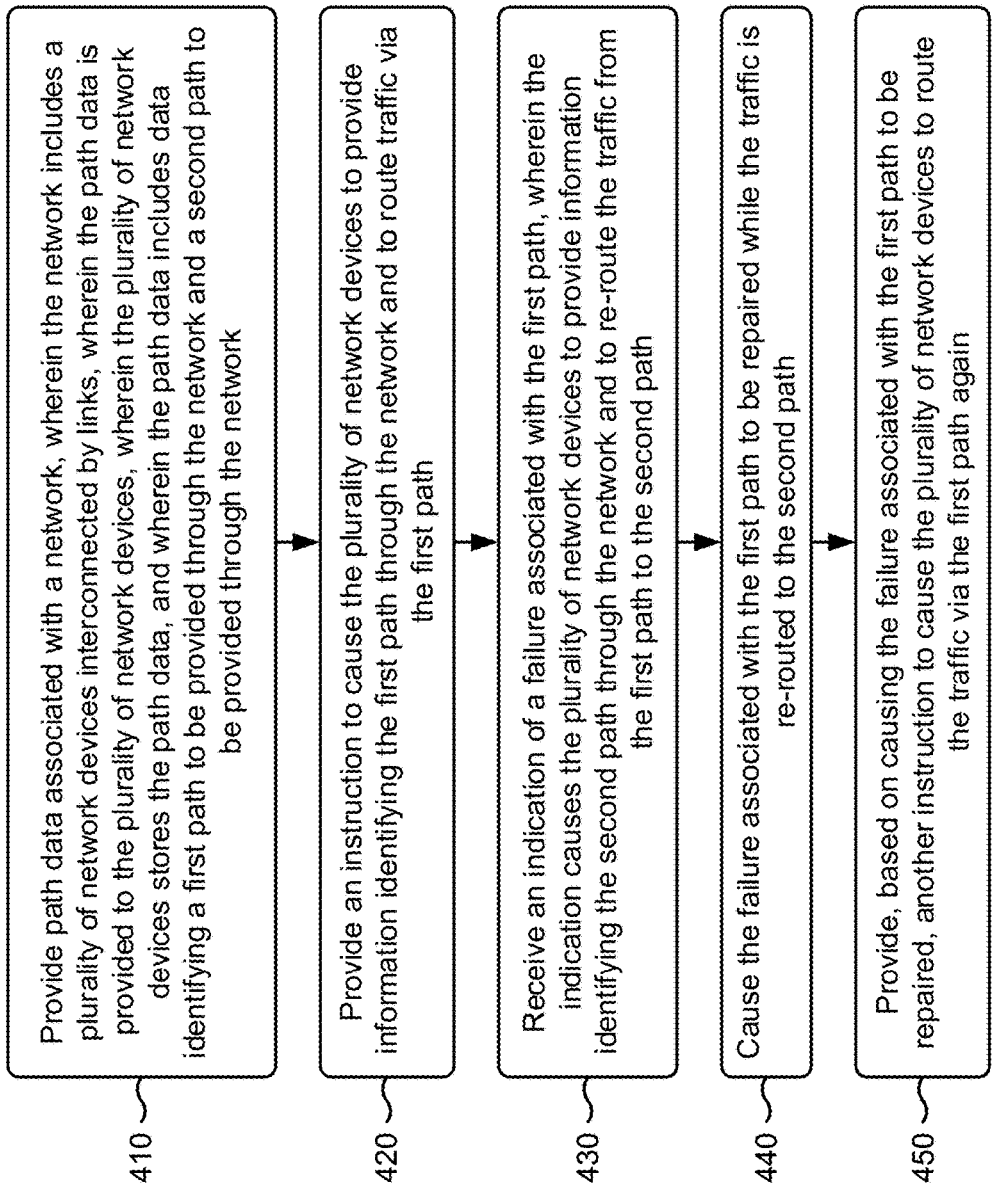

FIG. 4 is a flow chart of an example process 400 for controlling paths in a network via a centralized controller or network devices. In some implementations, one or more process blocks of FIG. 4 may be performed by a controller platform (e.g., controller platform 220). In some implementations, one or more process blocks of FIG. 4 may be performed by another device or a group of devices separate from or including the controller platform, such as a client device (e.g., client device 210) and/or a network device (e.g., network device 240).

As shown in FIG. 4, process 400 may include providing path data associated with a network, wherein the network includes a plurality of network devices interconnected by links, wherein the path data is provided to the plurality of network devices, wherein the plurality of network devices store the path data, and wherein the path data includes data identifying a first path to be provided through the network and a second path to be provided through the network (block 410). For example, the controller platform (e.g., using computing resource 224, processor 320, communication interface 370, and/or the like) may provide path data associated with a network, as described above in connection with FIGS. 1A-3. In some aspects, the network may include a plurality of network devices interconnected by links. In some aspects, the path data may be provided to the plurality of network devices, and the plurality of network devices may store the path data. In some aspects, the path data may include data identifying a first path to be provided through the network and a second path to be provided through the network.

As further shown in FIG. 4, process 400 may include providing an instruction to cause the plurality of network devices to provide information identifying the first path through the network and to route traffic via the first path (block 420). For example, the controller platform (e.g., using computing resource 224, processor 320, memory 330, communication interface 370, and/or the like) may provide an instruction to cause the plurality of network devices to provide information identifying the first path through the network and to route traffic via the first path, as described above in connection with FIGS. 1A-3.

As further shown in FIG. 4, process 400 may include receiving an indication of a failure associated with the first path, wherein the indication causes the plurality of network devices to provide information identifying the second path through the network and to re-route the traffic from the first path to the second path (block 430). For example, the controller platform (e.g., using computing resource 224, processor 320, storage component 340, communication interface 370, and/or the like) may receive an indication of a failure associated with the first path, as described above in connection with FIGS. 1A-3. In some aspects, the indication may cause the plurality of network devices to provide information identifying the second path through the network and to re-route the traffic from the first path to the second path.

As further shown in FIG. 4, process 400 may include causing the failure associated with the first path to be repaired while the traffic is re-routed to the second path (block 440). For example, the controller platform (e.g., using computing resource 224, processor 320, memory 330, storage component 340, communication interface 370, and/or the like) may cause the failure associated with the first path to be repaired while the traffic is re-routed to the second path, as described above in connection with FIGS. 1A-3.

As further shown in FIG. 4, process 400 may include providing, based on causing the failure associated with the first path to be repaired, another instruction to cause the plurality of network devices to route the traffic via the first path again (block 450). For example, the controller platform (e.g., using computing resource 224, processor 320, storage component 340, communication interface 370, and/or the like) may provide, based on causing the failure associated with the first path to be repaired, another instruction to cause the plurality of network devices to route the traffic via the first path again, as described above in connection with FIGS. 1A-3.

Process 400 may include additional implementations, such as any single implementation or any combination of implementations described below and/or in connection with one or more other processes described elsewhere herein.

In some implementations, a failure of the second path while the failure associated with the first path is being repaired may cause the plurality of network devices to re-route the traffic from the second path to a third path through the network. In some implementations, the third path may be controlled by the plurality of network devices. In some implementations, the first path and second path may include label-switched paths (LSPs).

In some implementations, after providing the other instruction to cause the plurality of network devices to route the traffic via the first path again, the controller platform may provide, to the plurality of network devices, information indicating that the controller platform is non-operational, where the information indicating that the controller platform is non-operational may cause the plurality of network devices to route the traffic via the first path or via the second path if the first path experiences another failure.

In some implementations, the controller platform may control the first path and the plurality of network devices may control the second path. In some implementations, a failure associated with the second path may be repaired by the plurality of network devices.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
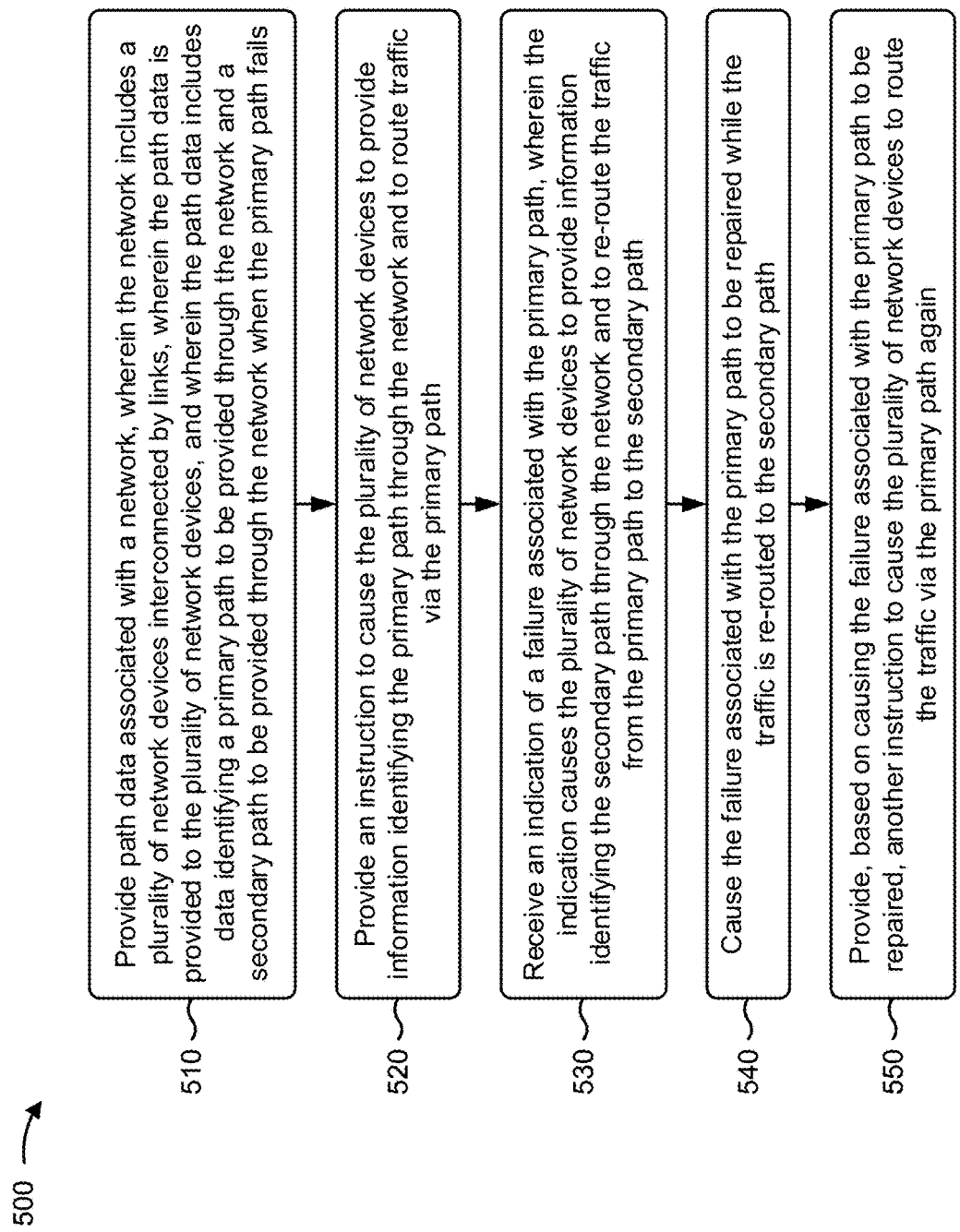

FIG. 5 is a flow chart of an example process 500 for controlling paths in a network via a centralized controller or network devices. In some implementations, one or more process blocks of FIG. 5 may be performed by a controller platform (e.g., controller platform 220). In some implementations, one or more process blocks of FIG. 5 may be performed by another device or a group of devices separate from or including the controller platform, such as a client device (e.g., client device 210) and/or a network device (e.g., network device 240).

As shown in FIG. 5, process 500 may include providing path data associated with a network, wherein the network includes a plurality of network devices interconnected by links, wherein the path data is provided to the plurality of network devices, and wherein the path data includes data identifying a primary path to be provided through the network and a secondary path to be provided through the network when the primary path fails (block 510). For example, the controller platform (e.g., using computing resource 224, processor 320, memory 330, communication interface 370, and/or the like) may provide path data associated with a network, as described above in connection with FIGS. 1A-3. In some aspects, the network may include a plurality of network devices interconnected by links and the path data may be provided to the plurality of network devices. In some aspects, the path data may include data identifying a primary path to be provided through the network and a secondary path to be provided through the network when the primary path fails.

As further shown in FIG. 5, process 500 may include providing an instruction to cause the plurality of network devices to provide information identifying the primary path through the network and to route traffic via the primary path (block 520). For example, the controller platform (e.g., using computing resource 224, processor 320, storage component 340, communication interface 370, and/or the like) may provide an instruction to cause the plurality of network devices to provide information identifying the primary path through the network and to route traffic via the primary path, as described above in connection with FIGS. 1A-3.

As further shown in FIG. 5, process 500 may include receiving an indication of a failure associated with the primary path wherein the indication causes the plurality of network devices to provide information identifying the secondary path through the network and to re-route the traffic from the primary path to the secondary path (block 530). For example, the controller platform (e.g., using computing resource 224, processor 320, communication interface 370, and/or the like) may receive an indication of a failure associated with the primary path, as described above in connection with FIGS. 1A-3. In some aspects, the indication may cause the plurality of network devices to provide information identifying the secondary path through the network and to re-route the traffic from the primary path to the secondary path.

As further shown in FIG. 5, process 500 may include causing the failure associated with the primary path to be repaired while the traffic is re-routed to the secondary path (block 540). For example, the controller platform (e.g., using computing resource 224, processor 320, memory 330, storage component 340, communication interface 370, and/or the like) may cause the failure associated with the primary path to be repaired while the traffic is re-routed to the secondary path, as described above in connection with FIGS. 1A-3.

As further shown in FIG. 5, process 500 may include providing, based on causing the failure associated with the primary path to be repaired, another instruction to cause the plurality of network devices to route the traffic via the primary path again (block 550). For example, the controller platform (e.g., using computing resource 224, processor 320, communication interface 370, and/or the like) may provide, based on causing the failure associated with the primary path to be repaired, another instruction to cause the plurality of network devices to route the traffic via the primary path again, as described above in connection with FIGS. 1A-3.

Process 500 may include additional implementations, such as any single implementation or any combination of implementations described below and/or in connection with one or more other processes described elsewhere herein.

In some implementations, the other instruction, to cause the plurality of network devices to route the traffic via the primary path again, may include information identifying specifications for repairing the primary path, where the specifications may cause the plurality of network devices to provide information identifying the primary path through the network again, to repair the primary path, and to route the traffic via the primary path again.

In some implementations, the primary path may be included in a plurality of primary paths provided through the network, and the controller platform may control the plurality of primary paths and may repair the plurality of primary paths when needed. In some implementations, the secondary path may be included in a plurality of secondary paths provided through the network, and the plurality of network devices may control the plurality of secondary paths and may repair the plurality of secondary paths when needed.

In some implementations, the path data may include data identifying a third path to be provided through the network, and a failure of the secondary path, while the failure associated with the primary path is being repaired, may cause the plurality of network devices to provide information identifying the third path through the network and to re-route the traffic from the secondary path to the third path.

In some implementations, the primary path and secondary path may include label-switched paths (LSPs). In some implementations, the controller platform may control the primary path and the plurality of network devices may control the secondary path.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

FIG. 6 is a flow chart of an example process 600 for controlling paths in a network via a centralized controller or network devices. In some implementations, one or more process blocks of FIG. 6 may be performed by a controller platform (e.g., controller platform 220). In some implementations, one or more process blocks of FIG. 6 may be performed by another device or a group of devices separate from or including the controller platform, such as a client device (e.g., client device 210) and/or a network device (e.g., network device 240).

As shown in FIG. 6, process 600 may include providing path data associated with a network, wherein the network includes a plurality of network devices interconnected by links, wherein the path data is provided to the plurality of network devices, and wherein the path data includes data identifying a first path to be provided through the network and a second path to be provided through the network when the first path fails (block 610). For example, the controller platform (e.g., using computing resource 224, processor 320, memory 330, communication interface 370, and/or the like) may provide path data associated with a network, as described above in connection with FIGS. 1A-3. In some aspects, the network may include a plurality of network devices interconnected by links, and the path data may be provided to the plurality of network devices. In some aspects, the path data may include data identifying a first path to be provided through the network and a second path to be provided through the network when the first path fails.

As further shown in FIG. 6, process 600 may include providing an instruction to cause the plurality of network devices to provide information identifying the first path through the network and to route traffic via the first path (block 620). For example, the controller platform (e.g., using computing resource 224, processor 320, storage component 340, communication interface 370, and/or the like) may provide an instruction to cause the plurality of network devices to provide information identifying the first path through the network and to route traffic via the first path, as described above in connection with FIGS. 1A-3.

As further shown in FIG. 6, process 600 may include providing, to the plurality of network devices, information indicating that the controller platform is non-operational, wherein the information indicating that the controller platform is non-operational causes the plurality of network devices to route the traffic via the first path or via the second path if the first path fails (block 630). For example, the controller platform (e.g., using computing resource 224, processor 320, communication interface 370, and/or the like) may provide, to the plurality of network devices, information indicating that the controller platform is non-operational, as described above in connection with FIGS. 1A-3. In some aspects, the information indicating that the controller platform is non-operational may cause the plurality of network devices to route the traffic via the first path or via the second path if the first path fails.

Process 600 may include additional implementations, such as any single implementation or any combination of implementations described below and/or in connection with one or more other processes described elsewhere herein.

In some implementations, when the controller platform becomes operational again, the controller platform may receive an indication of a failure associated with the first path, where the indication may cause the plurality of network devices to provide information identifying the second path through the network and to re-route the traffic from the first path to the second path; may cause the failure associated with the first path to be repaired while the traffic is re-routed to the second path; and may provide, based on causing the failure associated with the first path to be repaired, another instruction to cause the plurality of network devices to route the traffic via the first path again.

In some implementations, a failure of the second path while the failure associated with the first path is being repaired may cause the plurality of network devices to re-route the traffic from the second path to a third path through the network. In some implementations, the controller platform may control the first path and the plurality of network devices may control the second path. In some implementations, the first path and second path may include label-switched paths (LSPs). In some implementations, a failure associated with the second path may be repaired by the plurality of network devices.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Certain user interfaces have been described herein and/or shown in the figures. A user interface may include a graphical user interface, a non-graphical user interface, a text-based user interface, and/or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   providing, by a device, path data associated with a network,
      wherein the path data includes data identifying:
         a first path to be provided through the network, and
         a second path to be provided through the network, and
      wherein the device includes a centralized controller;
   providing, by the device, an instruction to cause one or more network devices to provide information identifying the first path through the network and to route traffic via the first path; and
   providing, by the device and to the one or more network devices, information indicating that the device is non-operational,
      wherein the information indicating that the device is non-operational causes the one or more network devices to route the traffic via the first path or via the second path if the first path experiences a failure.

2. The method of claim 1, wherein providing the information indicating that the device is non-operational causes the one or more network devices re-route the traffic to the second path, which is controlled by a network device of the one or more network devices.

3. The method of claim 1, wherein providing the information indicating that the device is non-operational causes the one or more network devices to:
  continue to route traffic via the first path, and
  manage the first path until the device becomes operational.

4. The method of claim 1, wherein the first path fails because of traffic congestion; and
  the method further comprises:
  sending instructions to cause the one or more network devices to re-route a portion of the traffic from the first path to the second path.

5. The method of claim 1, wherein the first path is a shortest path between the one or more network devices, and
  wherein the second path is a next shortest path between the one or more network devices.

6. The method of claim 1, wherein the information indicating that the device is non-operational includes one or more of:
  the one or more network devices failing to receive a signal from the device, or
  the one or more network devices failing to communicate with the device.

7. The method of claim 1, wherein before the device is non-operational, the device controls the first path.

8. A non-transitory computer-readable medium storing a set of instructions, the set of instructions comprising:
  one or more instructions that, when executed by one or more processors of a device, cause the device to:
  provide path data associated with a network,
    wherein the path data includes data identifying:
    a first path to be provided through the network, and
    a second path to be provided through the network;
  provide an instruction to cause one or more network devices to provide information identifying the first path through the network and to route traffic via the first path; and
  provide, to the one or more network devices, information indicating that the device is non-operational,
    wherein the information indicating that the device is non-operational causes the one or more network devices to route the traffic via the first path or via the second path.

9. The non-transitory computer-readable medium of claim 8,
  wherein prior to the device becoming non-operational, the device controls the first path; and
  wherein the information indicating that the device is non-operational causes the one or more network devices to control the first path until the device becomes operational again.

10. The non-transitory computer-readable medium of claim 8, wherein the one or more instructions, that cause the device to provide the information indicating that the device is non-operational, cause the device to:
  continue to route traffic via the first path, and
  manage the first path until the device becomes operational.

11. The non-transitory computer-readable medium of claim 8, wherein one or more of the following include label-switched paths:
  the first path, or
  the second path.

12. The non-transitory computer-readable medium of claim 8, wherein the first path is a shortest path between the one or more network devices, and
  wherein the second path is a next shortest path between the one or more network devices.

13. The non-transitory computer-readable medium of claim 8, wherein the information indicating that the device is non-operational includes one or more of:
  the one or more network devices failing to receive a signal from the device, or
  the one or more network devices failing to communicate with the device.

14. The non-transitory computer-readable medium of claim 8,
  wherein the first path is managed by the device, and
  wherein the second path is managed by the one or more network devices; and
  wherein the information indicating that the device is non-operational causes the one or more network devices to route the traffic via the second path.

15. A device, comprising:
  one or more processors configured to:
  provide path data associated with a network,
    wherein the path data includes data identifying:
    a first path to be provided through the network, and
    a second path to be provided through the network;
  provide an instruction to cause one or more network devices to provide information identifying the first path through the network and to route traffic via the first path; and
  provide, to the one or more network devices, information indicating that the device is non-operational,
    wherein the information indicating that the device is non-operational causes the one or more network devices to route the traffic via the first path or via the second path if the first path experiences a failure.

16. The device of claim 15, wherein providing the information indicating that the device is non-operational causes the one or more network devices re-route the traffic to the second path, which is managed by a network device of the one or more network devices.

17. The device of claim 15, wherein the one or more processors, when providing the information indicating that the device is non-operational, are to:
  continue to route traffic via the first path, and
  manage the first path until the device becomes operational.

18. The device of claim 15, wherein the first path and the second path include label-switched paths.

19. The device of claim 15, wherein the first path is a shortest path between the one or more network devices, and
  wherein the second path is a next shortest path between the one or more network devices.

20. The device of claim 15, wherein the information indicating that the device is non-operational includes one or more of:
  the one or more network devices failing to receive a signal from the device, or the one or more network devices failing to communicate with the device.

* * * * *